April 20, 1937.   R. J. GITS   2,077,881
OIL SEAL
Filed Feb. 18, 1935
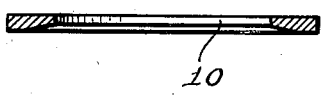
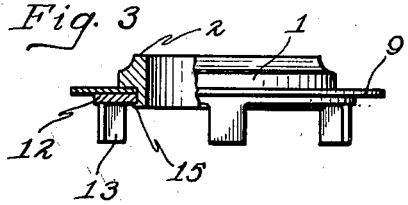
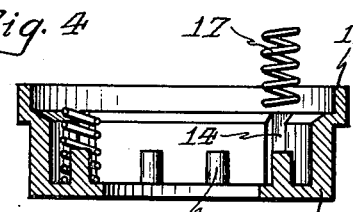
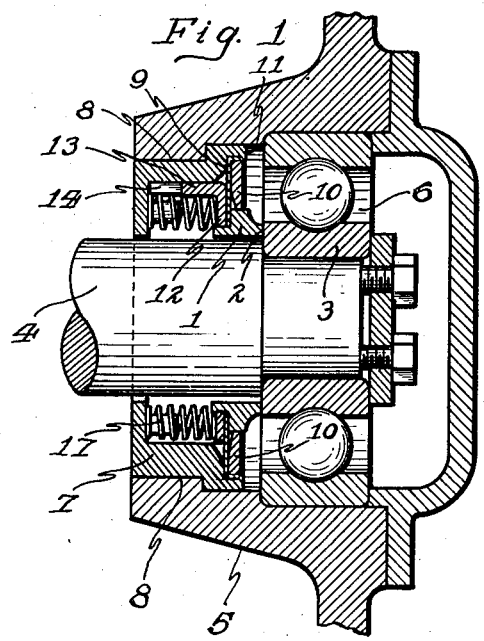
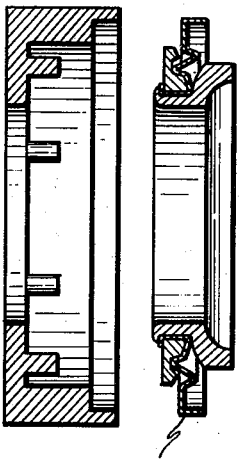
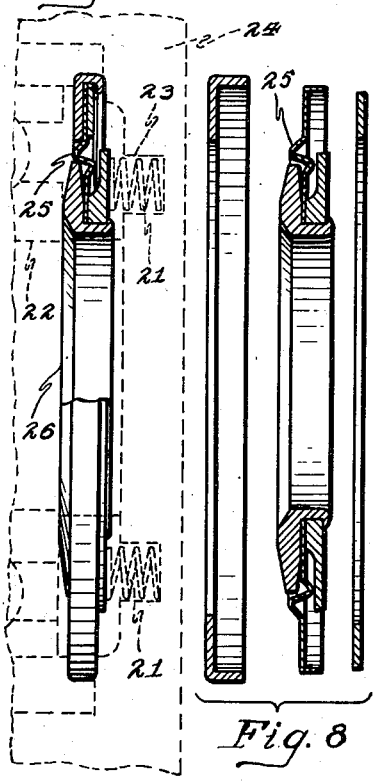
Inventor
Remi J. Gits Patented Apr. 20, 1937

2,077,881

UNITED STATES PATENT OFFICE 2,077,881

OIL SEAL

Remi J. Gits, Chicago, Ill.

Application February 18, 1935, Serial No. 6,937

2 Claims. (Cl. 286—11)

This invention relates to means for minimizing the passage of oil from a bearing along a shaft. The purpose of the invention is to provide improvements in flexible diaphragm seals, allowing for a wide range of material in the diaphragm to suit different conditions and permitting a metal to metal resilient contact at the sealing surface in an axial direction.

The purposes of the invention are accomplished by means of a construction as illustrated in the drawing, wherein:

Figure 1 is a sectional view of a bearing and the improved seal associated therewith.

Fig. 2 is a detail in section of the diaphragm retaining ring.

Fig. 3 is a detail partly in section showing the sealing ring, diaphragm and a guiding element for the seal.

Fig. 4 is a detail in section showing the seal housing and ring engaging springs carried thereby.

Fig. 5 is a side view partly in section of the construction modified to support a corrugated metal diaphragm instead of the non-metallic diaphragm used in the construction as shown in Fig. 1.

Fig. 6 shows sectional details of separate parts of the construction appearing in Fig. 5.

Fig. 7 is a side view and partly in section of the seal showing a further modification for use when the seal cushioning springs need not be assembled in the sealing unit. This view also shows by broken lines a bearing and its support associated with the seal.

Fig. 8 shows a sectional view of the seal illustrated by Fig. 7 but with its clamping rings spaced from other elements of the seal.

A common practice in preventing oil from traveling along a shaft from its bearings is the use of sealing elements bearing radially upon the shaft and resiliently to compensate for wear. The sealing element is a flexible material such as leather. With the improved construction herein disclosed, a highly efficient seal is provided without any rubbing contact on the flexible element of the seal. This element may be leather treated fabric, metal or other material capable of flexing, but the actual contact between the seal and the bearing or a shoulder on a shaft is provided for by a solid metal ring, preferably bronze, to which the diaphragm is attached.

As illustrated in Figure 1, the bronze ring 1 has a trued-up surface 2 having an annular bearing on the side of ball-race 3. These contacting surfaces are lapped or ground to fit together as closely as possible so as to form the seal between the rotating race 3 carried by shaft 4 and the stationary support 5 for the bearing 6.

The seal housing 7 tightly fits the inner surface 8 of bearing support 5 and a flexible diaphragm 9 extends between the seal housing 7 and the ring 1. This flexible ring-shaped diaphragm is clamped near its outer periphery against an inwardly extending shoulder or radial portion of the seal housing 7 by a metal ring 10 which is held in place by rolling the edge 11 of the housing together with an axially extending portion of the outer margin of the diaphragm 9 against the outer edge of ring 10. At its inner periphery the diaphragm 9 is clamped between the sealing ring and guide element 12. The latter is a ring-shaped member but has the feet 13 bent outwardly at right angles thereto to fit guide slots 14 formed in the seal housing 7. The edge 15 of the sealing ring is rolled over the inner edge of guide ring 12 to clamp it in place against the diaphragm and sealing ring. The seal housing 7 carries posts 16 for supporting compression springs 17 which bear between the seal housing and guide element 12, thereby holding the sealing ring 1 firmly into contact with the bearing ring 3.

The construction shown in Fig. 5 contains the same essential elements as the construction shown by Fig. 1, but the forms of the elements are somewhat changed to compactly support a corrugated metal diaphragm 18 extended between the sealing ring 19 and the seal housing 20.

A more compact disc form of the seal is illustrated by Figs. 7 and 8. The disc-like form of the entire seal unit is made possible by having the springs 21, for forcing the seal against the inner ring 22 of the bearing, supported in recesses 23 in the bearing support 24.

The sealing rings 1, 19 and 26 respectively in the three forms of the seal as illustrated all function to minimize the passage of oil from the bearing along the shaft by firmly engaging the rotating bearing races. The ring-shaped diaphragms 9, 18 and 25 serve to span the space between the sealing rings and the seal housings which tightly fit within the bearing supports.

In the operation of any of the forms illustrated, the sealing rings, such as the element 1 in Fig. 1, make annular and axial contact with a relatively rotating part and this contact is maintained, irrespective of wear, by the compression springs; and the resilient diaphragms such as 9 in Fig. 1, being flexible, close the space between the sealing rings and the seal housings irrespective of change in relative position thereof due to wear.

I claim:

1. As an article of manufacture, a unitary cartridge type oil seal comprising a cupped ring-like shell having an axially extending portion and an inwardly extending flange-like radial portion, a sealing ring disposed concentrically within said shell and having an axially facing bearing surface, a flexible radially extending ring-like diaphragm having an axially extending flange on its outer margin, said diaphragm being nested in said shell with its outer margin in engagement with the flange-like portion of said shell and its marginal flange in engagement with the axial portion of said shell, a flat clamping ring nested within said diaphragm and engaging the outer margin thereof to flatly hold the same against the radial flange-like portion of said shell, said axially extending portion of said shell together with the axially extending flange of said diaphragm being turned inwardly over the outer margin of said clamping ring to secure the same, and means to clamp the inner margin of said diaphragm to said sealing ring.

2. As an article of manufacture a unitary cartridge type oil seal comprising a cupped annular shell having an axially extending portion and an inwardly extending shoulder portion, a sealing ring disposed concentrically within said shell and having an axially facing bearing surface, a flexible radially extending ring-like diaphragm having an axially extending flange on its outer margin, said diaphragm being nested in said shell with its outer margin in engagement with the shoulder portion of said shell and its marginal flange in engagement with the axial portion of said shell, a flat clamping ring nested within said diaphragm and engaging the outer margin thereof to flatly hold the same against the shoulder portion of said shell, said axially extending portion of said shell together with the axially extending flange of said diaphragm being turned inwardly over the outer margin of said clamping ring to secure the same, and means to clamp the inner margin of said diaphragm to said sealing ring.

REMI J. GITS.